Jan. 18, 1927.

C. ESPING ET AL 1,614,782

GRAIN SHOCKER

Filed May 7, 1924    12 Sheets-Sheet 1

Jan. 18, 1927.

C. ESPING ET AL 1,614,782

GRAIN SHOCKER

Filed May 7, 1924   12 Sheets-Sheet 4

Inventors:
Conrad Esping,
Robert Esping.
by Banning & Banning.
Attys

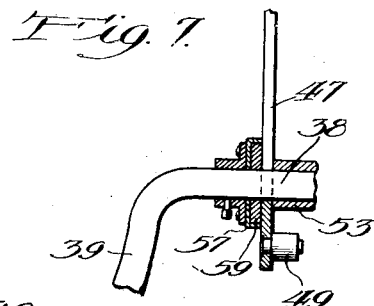
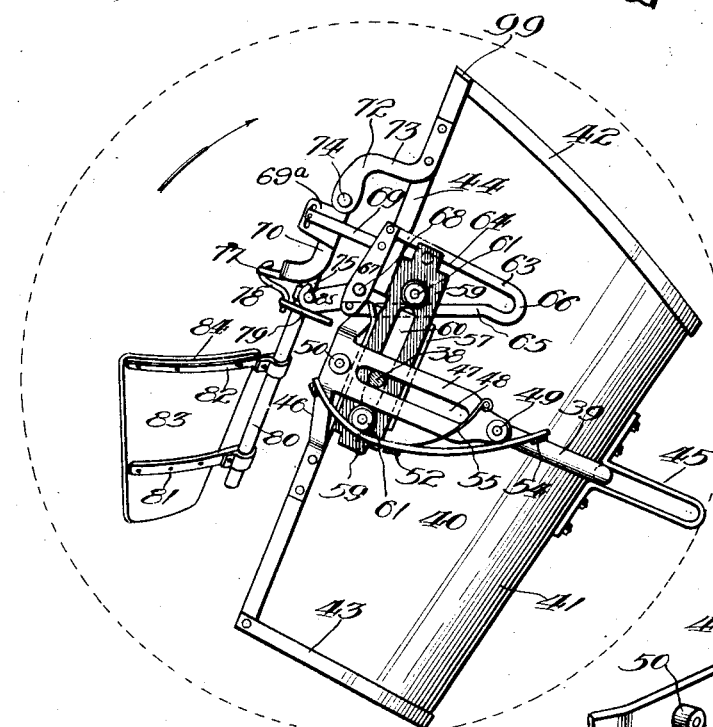
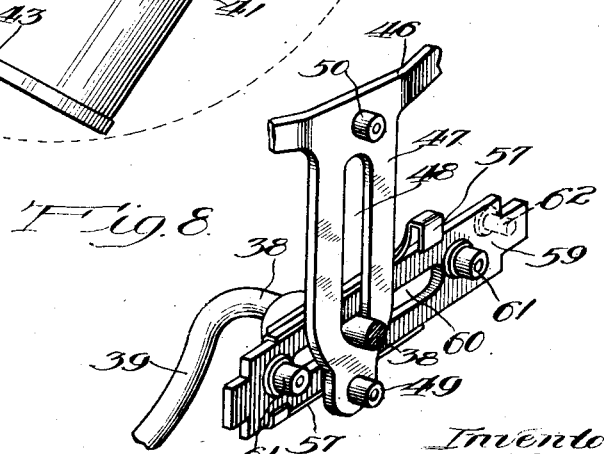

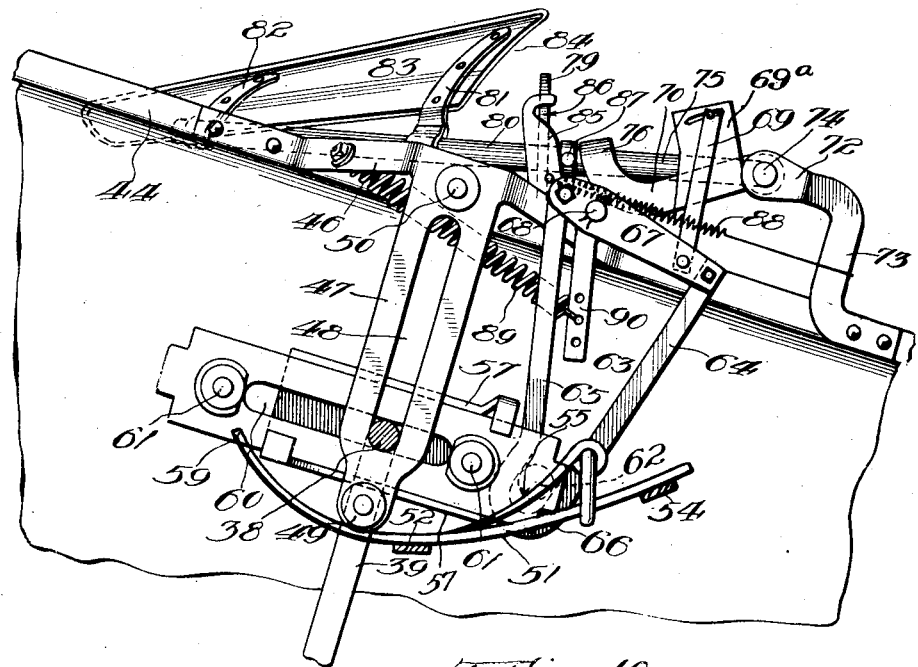

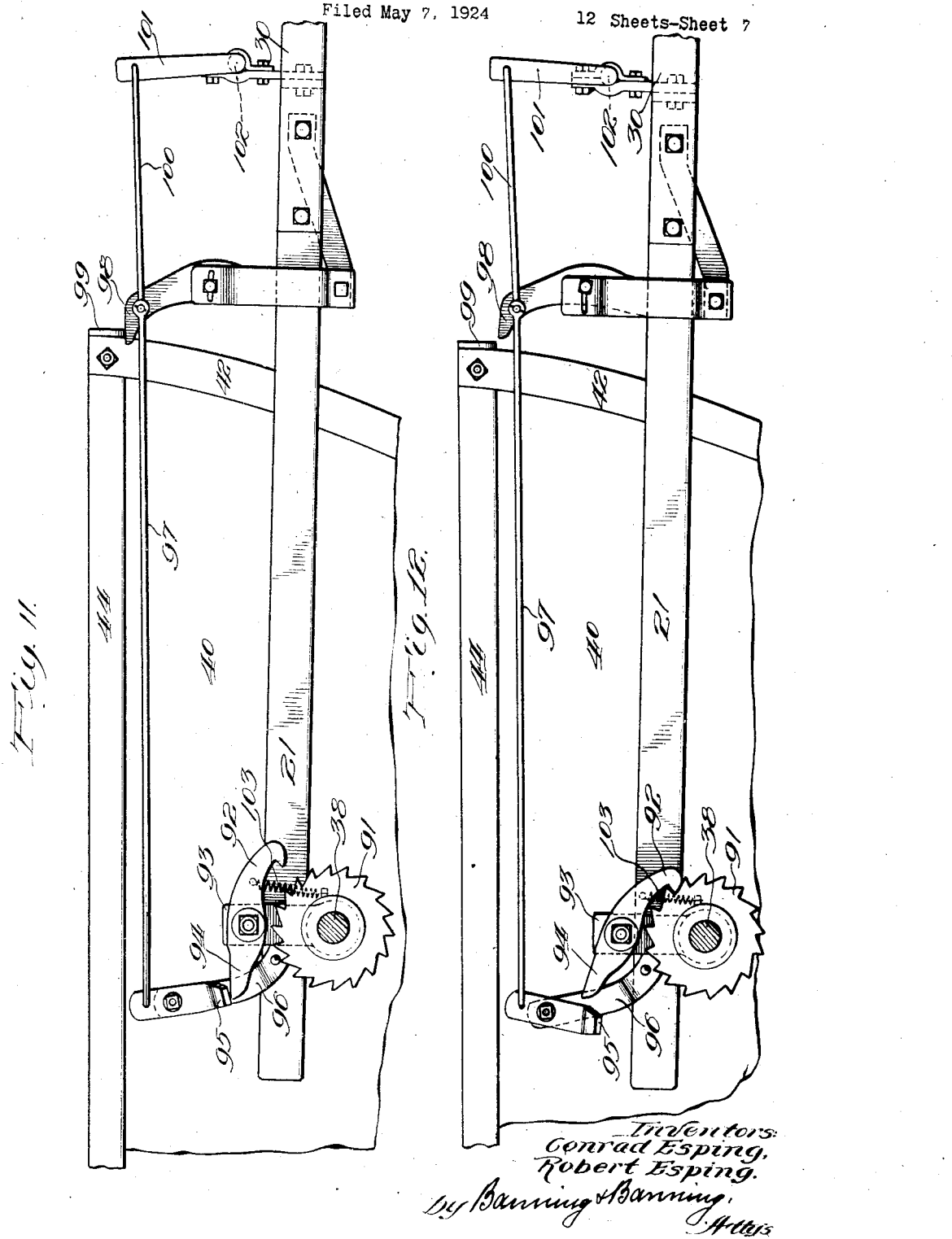

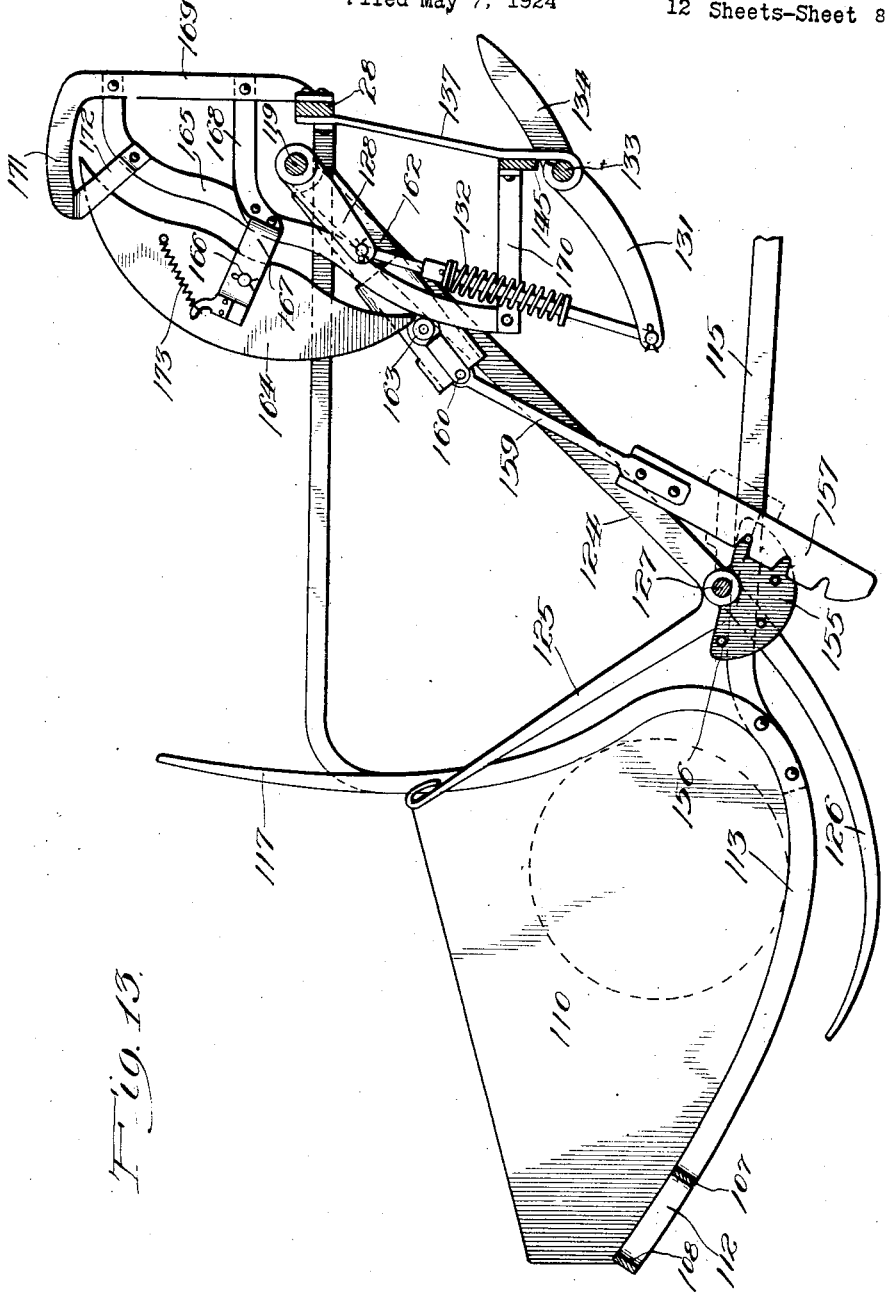

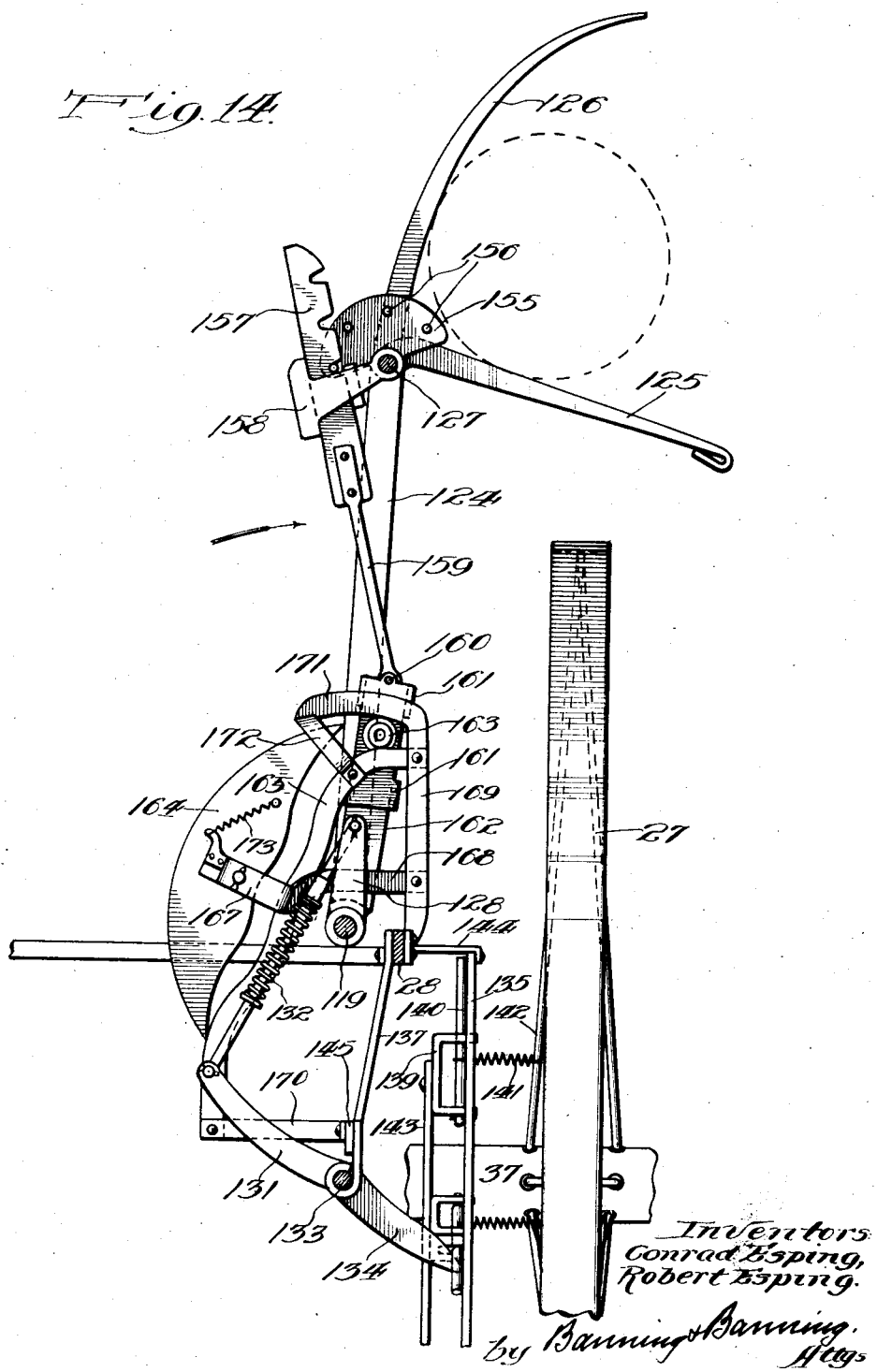

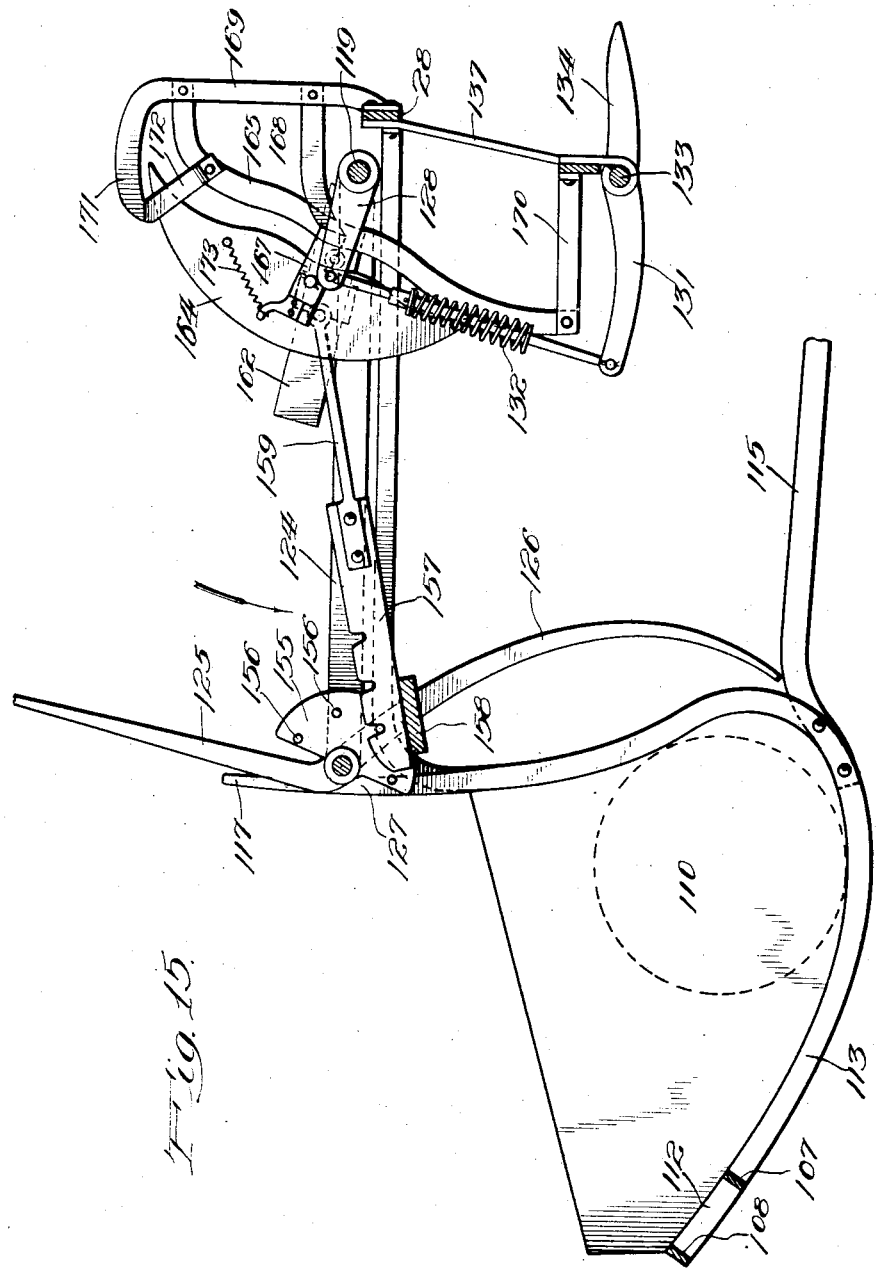

Jan. 18, 1927.

C. ESPING ET AL 1,614,782

GRAIN SHOCKER

Filed May 7, 1924     12 Sheets-Sheet 11

Inventors:
Conrad Esping,
Robert Esping.
by Banning & Banning,
Attys.

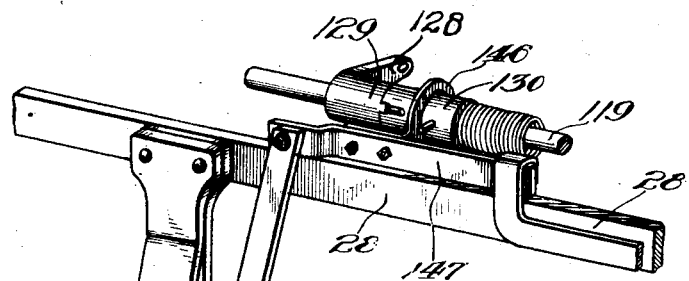
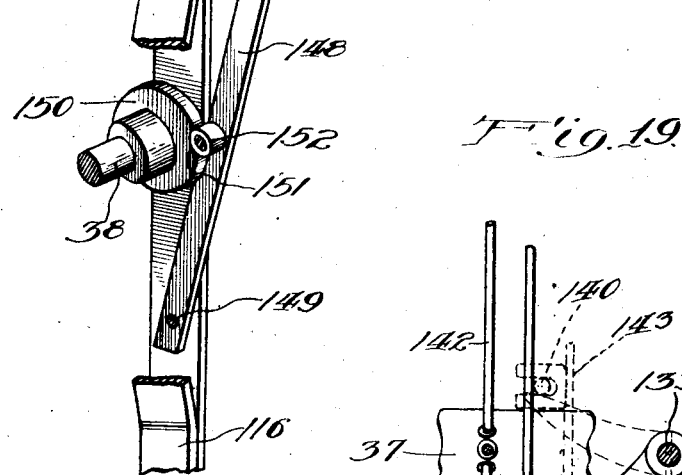
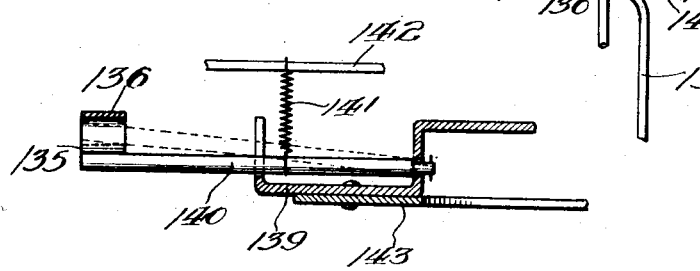

Patented Jan. 18, 1927.

1,614,782

UNITED STATES PATENT OFFICE.

CONRAD ESPING AND ROBERT ESPING, OF MOLINE, ILLINOIS, ASSIGNORS TO BERRY SHOCKER INCORPORATED, OF CHICAGO, ILLINOIS, A CORPORATION OF DELAWARE.

GRAIN SHOCKER.

Application filed May 7, 1924. Serial No. 711,608.

This invention relates to a grain shocker of the type which employs a rotatable open sided pan into which the sheaves or bundles are delivered from the binder with their butt ends forward until a shock has been accumulated, after which the pan is carried over the shock and returned to normal position after making a complete revolution.

Shockers of this character have heretofore been constructed which utilized power derived from the ground wheels for purposes of rotating the pan, but experience has shown that it is not desirable to rotate the pan concentrically with the axis of the ground wheels for the reason that such movement must be modified to secure satisfactory results, particularly as regards the provision of a sufficient elevation of the pan to clear the shock on its return movement. It is also desirable to cause a lowering of the pan during the instant the shock is being grounded in order to jam the base of the shock firmly upon the ground, and also to provide for a slight recession of the pan, as regards the forward line of advance of the machine, immediately thereafter in preparation for the somersaulting of the pan over the top of the shock.

The present invention is designed to conform to the above requirement by providing an adjustable connection between the pan and the main shaft upon which the pan is carried, so that while the shaft itself will rotate concentrically with the ground wheels, the pan will move at times in eccentric relation thereto.

The present invention also relates to the means provided for elevating and discharging the bundles into the shock, in timed relation to the advance of the machine, and to the means provided for actuating such mechanism through connections with one of the ground wheels and various other details and mechanisms which will fully appear in the detailed description of the invention as hereinafter described and claimed.

In the drawings:

Fig. 4 is a detail of the pan and associated mechanisms when moved to vertical position to ground the shock;

Fig. 5 is an enlarged detail of the means for actuating the compressor wings;

Fig. 6 is a view showing the pan returning to normal or receiving position;

Fig. 7 is a detail showing one end of the main shaft with parts associated therewith;

Fig. 8 is a perspective showing the end of the pan shaft with the adjustable pan mountings associated therewith;

Fig. 9 is a large side elevation of one of the pan mountings and the compressor mechanism associated therewith, with the compressor wing partially moved toward compressing position;

Fig. 10 is a plan view of the same;

Fig. 11 is an enlarged detail of the ratchet drive for the pan in unengaged position;

Fig. 12 is a similar view with the parts in engaged position;

Fig. 13 is a detail of the elevator mechanism in bundle receiving position;

Fig. 14 is a view of the same mechanism with the parts in bundle discharging position;

Fig. 15 is a similar view showing the bundle elevator arm returning to normal position;

Fig. 18 is a perspective detail of the clutch mechanism for throwing the bundle elevator into and out of clutch relation with the inner ground wheel; and Figs. 19 and 20 are enlarged details of certain of the mechanisms illustrated in Fig. 17.

*Pan tilting and compressor mechanism.*

Figure 1:
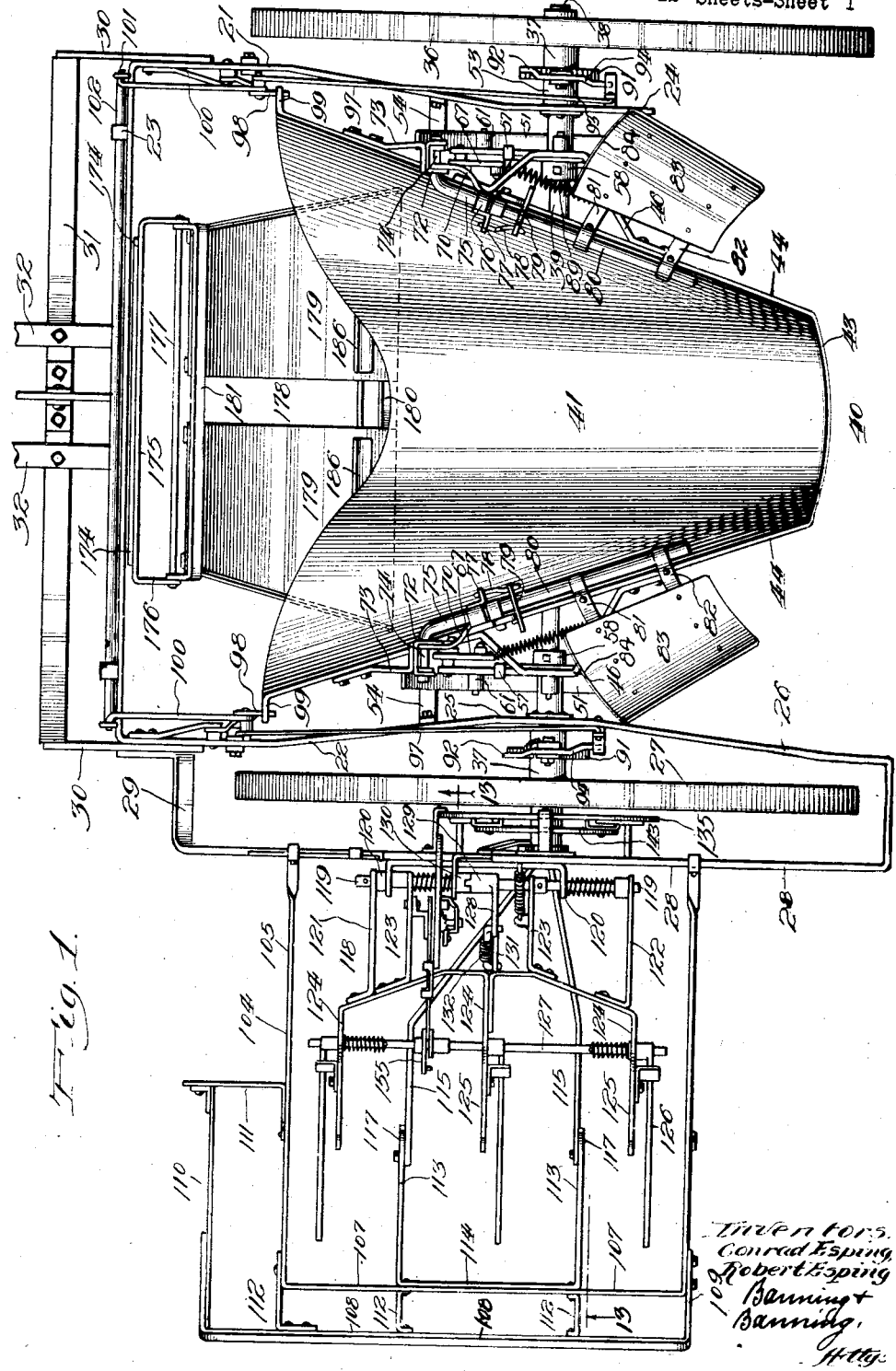
Figure 1 is a plan view of the shocker with the pan in prostrate or receiving position.

The machine as a whole is mounted upon and carried by a horizontally extending U-shaped frame comprising an outer side rail 21 and inner side rail 22 and a front cross rail 23, giving to the frame structure a U-shaped formation open at the rear end. The outer rail, at its rear end 24, is inwardly offset, and the inner rail 22 at its center 23 is similarly offset toward the center of the machine, the inner rail differing, however, from the outer rail in that it merges into a rearward extension 26, which embraces the periphery of an inner ground wheel 27 and merges into an elevator frame rail 28, the forward end 29 of which is angled to make connection with the forward end of the inner side rail 22.

The front portion of the main frame is reinforced by the provision of forwardly extending plates 30 which unite with the front cross bar 31, and serve to reinforce the forward portion of the machine. The reinforcing cross bar 31, in conjunction with the front rail 23, serves to afford points of attachment for a forwardly extending bracket 32 which carries a vertical bearing 33 within which the upper end of a caster pintle 34 is journaled. The pintle affords a journal mounting for a caster wheel 35 which in conjunction with the inner ground wheel 27 and the similar outer ground wheel 36 affords a three point ground contact for supporting the machine.

Figure 2:
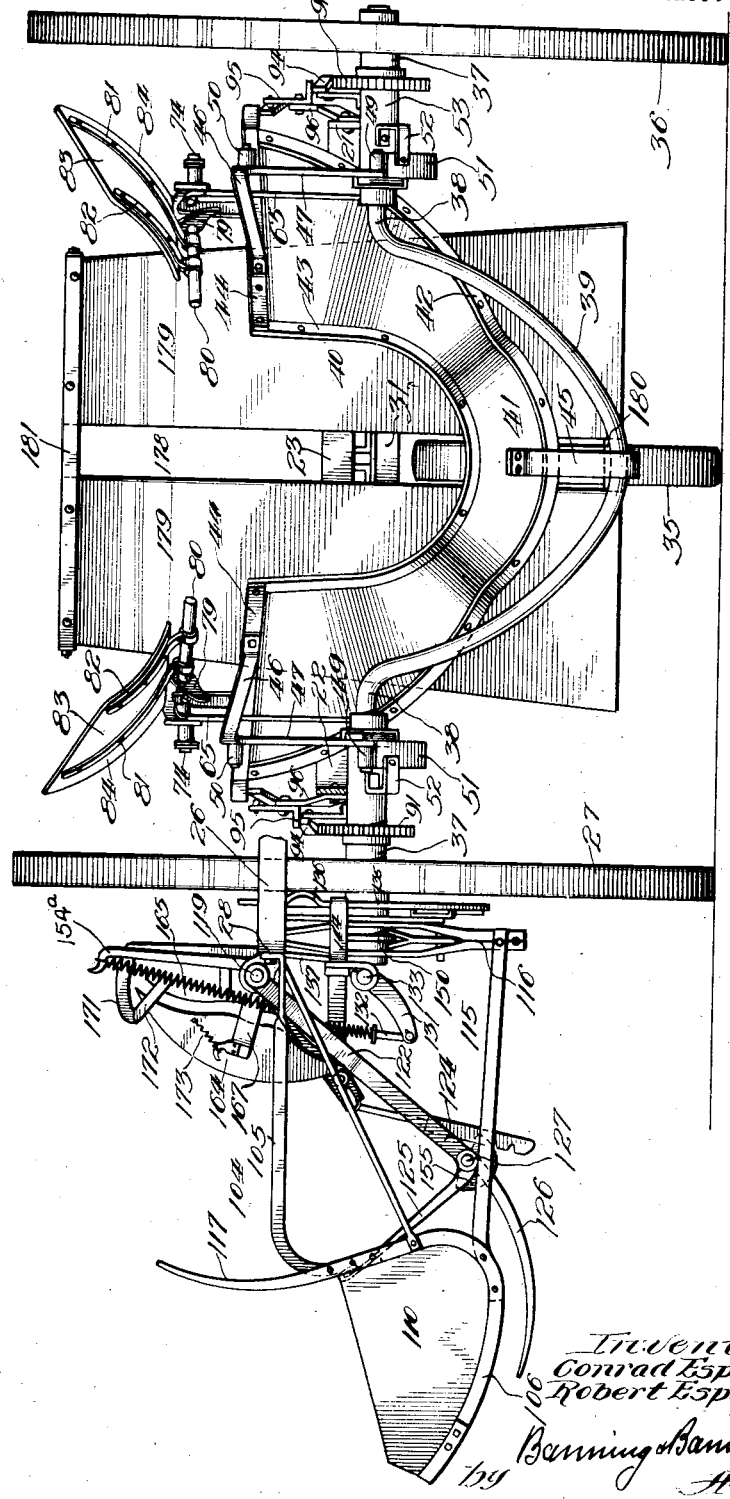
Fig. 2 is a rear end elevation of the same.

The ground wheels are centered upon hubs 37, which hubs are journaled upon the aligned outer ends 38 of an arched axle 39, best shown in Fig. 2. The axle affords a mounting for an open sided pan 40 of generally half frustrum conical formation with its enlarged open end normally extending forward, which pan when receiving the bundles occupies the position shown in Fig. 3. The bottom of the pan is provided with a longitudinally extending center channel 41 which is designed to receive the first bundle delivered and align the same in a true fore and aft direction as a base or foundation upon which is built up the shock. The pan is reinforced at its normally forward enlarged end by a forward band 42 and is similarly reinforced at its reduced rear end by a band 43, the ends of the two bands being connected by marginal straps 44 which reinforce and stiffen the pan along its normally upper edges.

Figure 3:
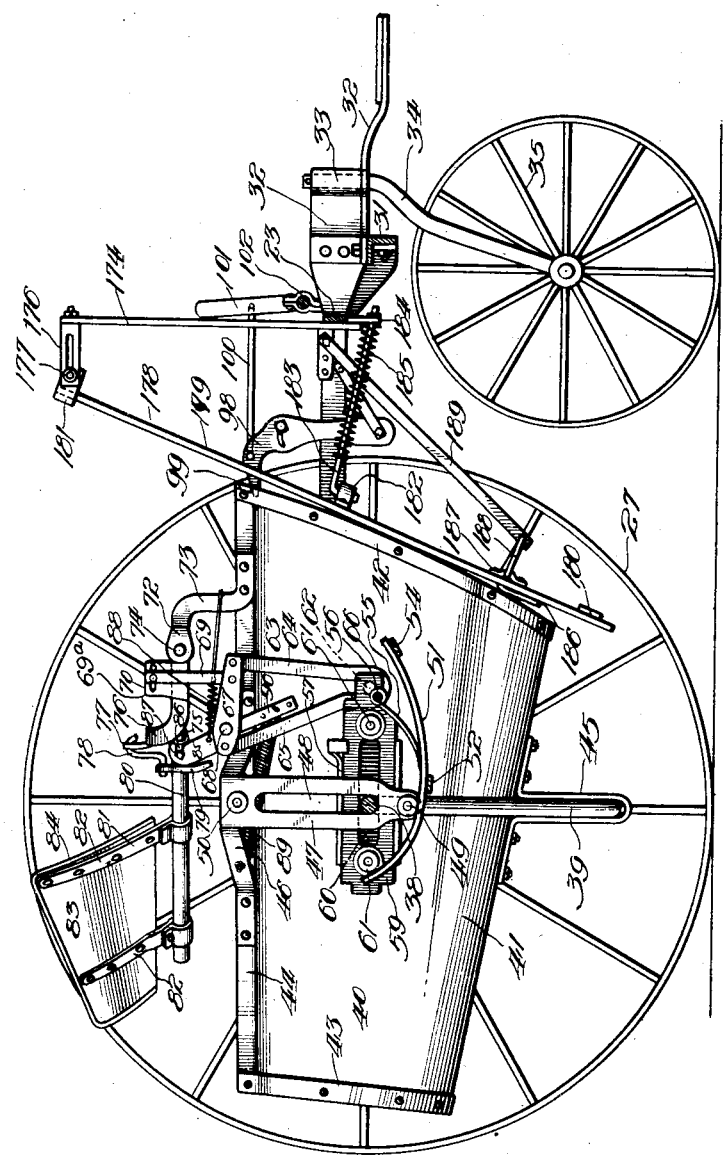
Fig. 3 is a side elevation taken on the outer side or side most distant from the binder with the pan in receiving position.

The center of the pan has secured thereto an outwardly protruding loop 45 which embraces the center of the arched axle and permits of an in and out movement of the pan with respect to the axle, the pan and axle being configured at all points to permit of this movement. As shown in Figs. 2 and 3, the body of the pan is in distant relation to the center of the axle while in Fig. 6 the pan is in close relation to the axle, the relation of these parts being such as to permit of controlled variations between the pan and the axle during various stages of the operation of the machine.

The pan is supported on each side by the provision of an outwardly bowed bracket 46, the ends of which are bolted to the marginal straps 44, and each bracket is formed to provide a centrally disposed guide link 47 which normally projects downwardly, that is to say, toward the base of the pan. Each guide link is provided with a longitudinally extending slot 48 which embraces the proximate end portion 38 of the main shaft. Each guide link is provided with outer and inner end rollers 49 and 50, which rollers co-act in turn with a fixed cam track 51 supported in part upon a rear bracket 52, which rear bracket is secured to a sleeve 53 which encircles the proximate end portion of the main axle, which sleeves are rigidly secured to the main frame and constitute aligned journals for the main axle.

The cam tracks are additionally supported at their forward ends by the provision of forward brackets 54 which are bolted to proximate portions of the inner and outer frame rails (Fig. 1). The cam track has associated therewith a switch plate 55 which is pivoted upon a rigidly supported pintle 56, which switch plate occupies a rearward and downward converging relation to the cam track and being hinged, will lift, on occasion, to permit one or the other of the rollers 49 or 50 to pass thereunder. It will be understood that all of the mechanisms now being described are duplicated on each side of the machine, so that it is not deemed necessary to continually define these parts in duplicate.

It will be noted that the slots in the guide links 47 lie in the same transverse plane with the arched axle, and this relationship is maintained in all positions of adjustment despite the fact that the slotted links, by movements within this plane, may alter the relationship of the pan to the axis of the axle. The free or normally lower end of each slotted link is engaged by the edge of a guide plate 57 which extends in transverse relation to the slotted link, the relationship being that of an inverted cross.

Each guide plate is provided on its inner face with a boss 58 (Fig. 1) which encircles the main shaft and is held in fixed relation thereon so as to turn therewith. Each guide plate serves as a guide mounting for a sliding link plate 59 provided with a slot 60 through which the shaft is entered. The relationship of these parts is such that the sliding link plate will also maintain its transverse relation with respect to the slotted link, but may have varying positions of adjustment from end to end thereof. The sliding link plate is provided near each end with a roller 61, which rollers are adapted to travel upon the associated cam track and switch plate in order to impart endwise movements to the link plate, which it will be noted extends in facewise relation to the guide link on the inside thereof.

The normally forward end of each sliding link plate is provided with a roller 62, which roller co-acts with a loop lever 63 comprising normally front and rear arms 64 and 65 which converge at the free end 66 of the loop lever. The normally upper ends of the arms are connected to a cross head 67 which is pivoted to a pintle 68 outstanding from the normally upper edge of the pan.

Pivoted to the cross head 67 is a link 69 the opposite end of which is pivoted by a pin and slot connected to a plate 69ᵃ upstanding from a lever 70, illustrated in detail in Figs. 5, 9 and 10. The lever at its normally forward end 71 is hooked back upon itself and is mounted within a bifurcated bracket head 72 supported upon a bracket arm 73 which is bolted to a proximate portion of the pan rim. A pivotal mounting is afforded by the normally forward end 74 of a compressor wing shaft 75, the main portion of which extends in normally parallel relation to the upper rim of the pan, while the portion 74 constitutes a pivotal mounting for the shaft 75 as a whole, so that the shaft may be swung downwardly from its normal position to project in an oblique relation toward the base of the pan under conditions hereinafter described.

The lever 70 at its normally rear end is provided with an inwardly turned finger 76 which is arched over the shaft 75 and this finger on its inner side carries an eye 77 into which is hooked the end of an arm 78, the opposite end of which is rigidly entered into the inner end of a cross head 79 which is fixedly mounted upon a sleeve 80, which encircles the major portion of the shaft 75 at its free end. The sleeve furnishes a mounting for a pair of arms 81 and 82, which arms carry a compressor wing 83 having a normally forward edge 84 which lies about midway of the length of the pan, so that when the two wings, on opposite sides of the pan, are swung inwardly to overlie the contents of the pan, the edges 84 will bear against the middle portion or waist of the shock, and the wings will serve to compress the head of the shock while permitting the base of the shock to expand which is necessary in order to afford a broad foundation on which to ground the shock.

It will be apparent from the above that when the link 69 is drawn downwardly, the free end of the lever 70 will move toward the pan with the result first of rotating the sleeve upon the shaft and thereby closing the compressor wing, and this movement will continue until the hooked finger on the lever 70 is brought into engagement with the shaft 75 itself after which a continued movement of the lever will occasion an inward oscillation of the shaft, which will thus be brought into an oblique compressive position, as indicated in Fig. 9.

The wings are normally held in open position by the action of a latch 85 provided in its normally forward edge with a notch 86 which, when the lever 70 is lifted as in Fig. 5, engages with a pin or bolt 87 protruding laterally from the end of the sleeve 80. This engagement is maintained by a spring 88 which is secured at opposite ends to the latch and to the bracket arm 73. When in normal position (Fig. 5) the outer end of the cross head 79 will bear against the normally rear edge of the latch to lock the notched portion of the latch onto the inner bolt 87. When, however, the lever 70 has moved downwardly to engagement with the shaft 75, the outer end of the cross head 79 will be lifted sufficiently to clear and release the latch, after which the down pressure on the shaft 75 will draw the pin 87 out of the notch, springing back the latch and permitting the shaft to be oscillated inwardly toward the base of the pan.

The loop lever 63 is acted upon by a coil spring 89, the normally forward end of which is hooked into an arm 90 depending from the lever cross head 67, and the opposite end of the spring is secured to the bracket 46. This tends to draw the free end of the loop lever toward the slotted link 48 and to exert a down pull on the link 69 and parts associated therewith.

Each of the ground wheels has fixedly secured to its hub a ratchet wheel 91 (Figs. 11 and 12) which rotates constantly during the forward advance of the shocker. The ratchet wheel is provided with forwardly projecting teeth which co-act with a dog 92 pivoted upon a standard 93 which extends upwardly from the side rail, one being provided on each side of the machine. The tail 94 of the dog is adapted to be engaged by a finger 95 outwardly projecting from and pivoted to a bracket arm 96 secured at its lower end, which arm is engaged by a draw rod 97, the forward end of which is pivoted to a latch 98 adapted to be engaged by a lug 99 on the normally forward upper corner of the pan to support the pan in horizontal position during the bundle receiving period. This arrangement is duplicated on each side of the machine, and each of the latches is engaged by a link 100, the forward ends of which links are pivoted to the upstanding ends 101 of a rock shaft 102, which latter extends across and is journaled to the front of the machine in close proximity to the frame cross rail 23.

The operation of the pan actuating and bundle compressing mechanisms heretofore referred to will now be described. After a sufficient number of bundles have accumulated in the pan to build up a shock, the rock shaft 102 will be rocked thereby simultaneously retracting the latches 98 and releasing the dogs 92, as indicated in Fig. 12. The dogs will immediately engage with the rotating ratchet wheels through the action of springs 103 at the moment the forward end of the pan is released from support, so that the forward end of the pan will begin to drop in conformity with the rotative movement now being imparted to the axle.

This rotation will cause the rollers 49 at the lower ends of the slotted links 47 to ride rearwardly along the cam track and will likewise cause the forward roller 61 on the slotted slide link 59 to ride down upon the switch plate 55. The configuration of the cam track and switch plate is such that, under the influence of the weight of the pan and its contents, the link members will begin to shift their positions with respect to the end of the main shaft upon which they are mounted.

As the forward end of the pan swings down toward discharging position, the upper edge of the pan will begin to draw back and down into closer proximity to the axle and at the same time the slide links 59, which control the swing of the compressor wings, will begin to draw back and impart a pull upon the loop lever 67 with the result that during the initial portion of the discharging operation, the compressor wings will be closed against the shock. During this initial operation, the relationship of the parts is indicated in Fig. 9, which shows the pan in a partially tilted position with the slide plate 59 drawn back to a considerable degree, but without as yet any readjustment of the position of the guide link 47.

As the operation continues, the parts will assume the positions indicated in Fig. 4, which indicate a movement of 90° from the original position. With the parts in this position, the outer roller 49 will have cleared the cam track and the roller 50 will have begun to act and from this time now, the engagement of the roller 50 will have the effect of forcing the pan rearwardly with respect to the machine frame until this rearward movement is exhausted by the engagement of the normally upper ends of the slots 48 with the proximate portions of the main shaft. The position assumed by the various mechanisms during the period required for the pan to move from the vertical position, shown in Fig. 4, to an inverted position, required to carry the pan over the top of the shock, is maintained up to the time that the pan has reached the returning position shown in Fig. 6. This is the period during which the pan is required to clear the shock without pressing upon or disturbing it, and during this interval the mechanisms are so designed as to cause a retraction or momentary recession in the forward advance of the pan and likewise a bodily lifting movement thereof, so that the pan will be enabled, despite the forward advance of the shocker as a whole, to vault over from behind the deposited shock and rise to a sufficient elevation to completely clear it.

During the same interval, while the shaft stands in close proximity to the normally upper ends of the slotted guide links, as in Fig. 6, the roller 61 at the normally rear end of the slide link 59 will act to impart the return thrust to said link required to restore the compressor wings to their open position in readiness for the final return of the pan to receiving position.

During these pan tilting operations, the pan will be overturned through the thrust imparted by the arched portion of the main axle against the loop 45 which is calculated to receive this thrust irrespective of variations in the position of the pan with respect to the axle, and the loop lever 63 is likewise designed in the form shown to afford a proper co-action at all times between the roller 62 on the slide link and the loop lever irrespective of variations in the relative positions of these parts occasioned by the in and out movements of the pan.

*The bundle feeding mechanism.*

The bundle feeding mechanism is designed to receive bundles singly from the binder and carry them upwardly and outwardly to a position whence they may be thrust into the pan. With this end in view, the elevator co-operates with a cradle 104 which extends inwardly from the left or inner side of the shocker and occupies a position, comparatively low down, to receive bundles delivered from the binder. The cradle consists of inwardly extending front and rear arms 105 which are secured to the rail 28 of the frame extension, and these arms at their outer ends are doubly bent, first downwardly and then inwardly, to afford a hook shaped receiving portion 106. As shown in Fig. 1, the two arms 105 are arranged at the front and rear of the elevator structure, and the cradle portions of the arms are connected at their outer ends by a fore and aft connecting rail 107. The structure as a whole is reinforced by an extension comprising a fore and aft rail 108 connected to the end portion of the rear arm by an angular extension 109 and connected at its forward end by a butting plate 110 which also is secured by a bracket 111 to the bent portion of the forward arm. This provides an extension beyond the forward end 105 which is closed by the butting plate 110. Intermediate spacing brackets 112 are provided between the rails 107 and 108.

The cradle further comprises a pair of intermediate bent arms 113 which are curved to conform to the curvature of the front and rear outer arms, but which extend to a point above the upper bend thereof, which arms 113 are integrally formed with the connecting bar 114 which is bolted or otherwise secured to the rail 107, and these intermediate cradle arms are further supported by braces 115 which converge toward the main frame of the machine and are secured to a hanger 116, the upper end of which is bolted to the frame rail 28 (Fig. 2). In order to extend the cradle portion of the outer arms to a height equal to that of the upper ends of the intermediate arms, the outer arms are provided with tines 117 which extend upwardly as a continuation of the cradle, as best indicated in Fig. 2.

The cradle co-operates with an elevator 118 which is pivoted upon a horizontal shaft 119, journaled within the ends of a journal bracket 120, secured to the outer side of the rail 28. The elevator consists of front and rear supporting arms 121 and 122 respectively, and a pair of intermediate supporting arms 123 all of which are fixedly secured to the shaft 119 and oscillate as the shaft is rocked.

The supporting arms in unison furnish a frame or support for a set of three lifting arms 124 each of which, at its outer end, is provided with an angularly disposed up turned finger 125, which fingers are so configured that their ends will always lie practically outside of the confines of the cradle structure and between the arms thereof so as not to interfere with the bundles deposited within the cradle. The fingers 125 co-act with a set of curved tines 126 all of which are mounted upon and carried by a rock shaft 127 which is journaled through the several elbows formed at the points of mergence of the fingers 125 with the arms 124. These tines when lowered occupy the position shown in Fig. 13, in which they lie below and in position to pass through the cradle as the elevator structure is swung upwardly. In this position, the tines subtend an angle of about 90° with the fingers 125, but upon the return swing of the elevator, and in order that the tines may clear the cradle and its contents, the tines are swung back into the position indicated in Fig. 15, in which position they will lie in substantially diametrically opposite relation to the fingers 125.

The means provided for rocking the elevator shaft 119, and the tine operating shaft 127 will now be described. Referring to Figs. 13 to 20 inclusive, the shaft 119 freely carries a crank arm 128 which is mounted upon a clutch hub 129 which co-acts with a clutch collar 130 which is slidably keyed upon the shaft 119, so that with the clutch elements engaged, oscillations imparted to the crank 128 will be imparted to the shaft and to the elevator mechanism carried thereby.

Figure 16:
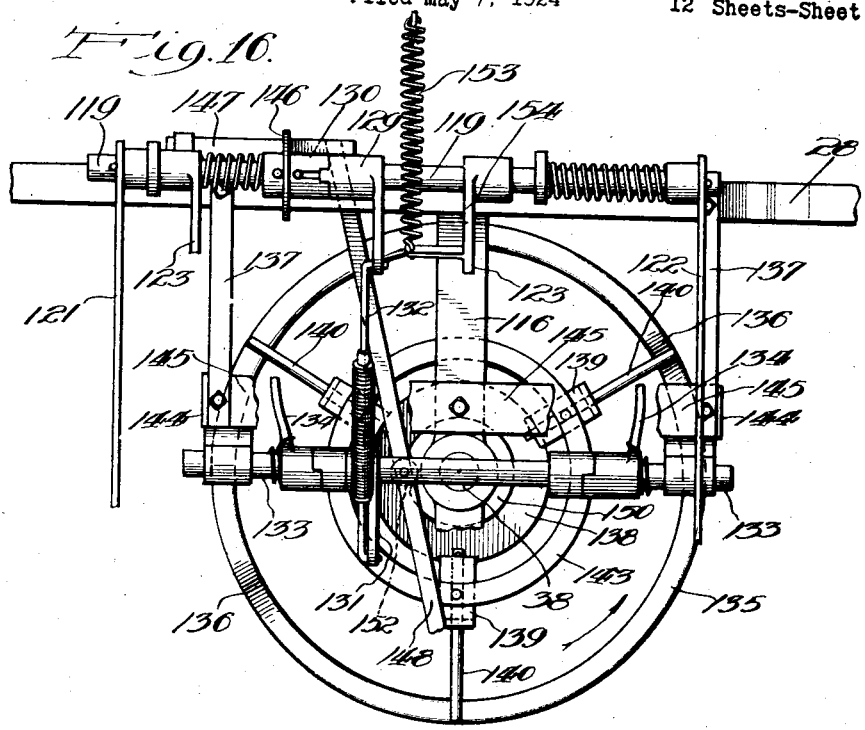
Fig. 16 is a detail side elevation of the means for actuating the bundle elevator.
Figure 17:
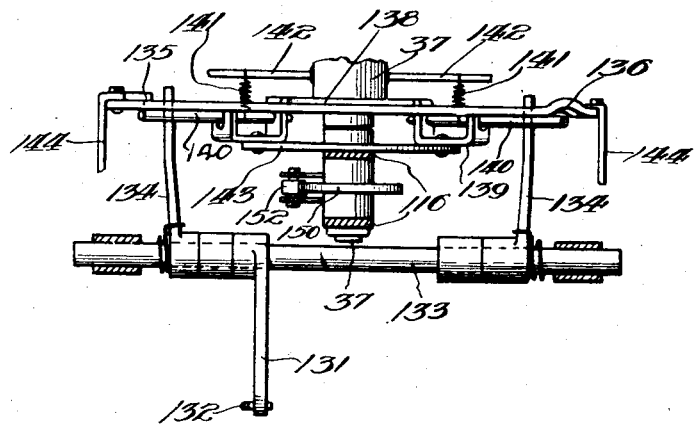
Fig. 17 is a plan view of the same.

The freely mounted crank 128 co-acts with a crank 131 with which it is connected by a spring-relief-connecting rod 132. The crank 131 (Figs. 16 and 17) is mounted upon a short rock shaft 133 which carries a pair of fingers 134 which are adapted, when the shaft is rocked, to subtend arcs of circles within the plane of the circular track 135 provided at opposite points in its circumference with depressions 136. The shaft 133 is journaled from a pair of hangers 137, the upper ends of which are secured to the frame rail 28, and the longitudinal center of the shaft 133 intersects the axis of the end portion 38 of the main shaft (Fig. 16).

The hub 37 of the inner ground wheel has secured thereto a disk shaped bracket plate 138 provided around its periphery with three equi-distant radially arranged brackets 139 within which are hingedly mounted a set of three fingers 140, the outer ends of which are afforded a limited in and out movement with respect to the plane of the ground wheel. The ends of these fingers are held in contact with the face of the ring shaped track through the action of coil springs 141, the ends of which are secured to spokes 142 on the ground wheel, so that as the wheel rotates, the fingers will follow the face of the track until the depressions are reached at which points they will be drawn back and into the depressions.

The bracket arms are reinforced by the provision of a ring 143 which is bolted to the several brackets, so that the entire mounting for the fingers will rotate with the wheel hub within the periphery of the track. In order to afford the proper clearance, the ring track 135 is supported from offset brackets 144 which are secured to a plate 146 which is supported at its ends from the hangers 137 and at its center by connection with the hanger 116, which latter hanger, as shown in Figs. 2 and 18, is of bifurcated formation at its center through which point the end 37 of the main shaft is entered.

In order to throw the clutch elements 129 and 130 into and out of clutch, the sleeve 130, which is slidably keyed to the shaft 119, is engaged by a clutch collar 146 carried by a slide plate 147, (Figs. 16 and 18) which slide plate in guided for movement along the frame rail 28. The slide plate has pivoted thereto the upper end of a cam lever 148, the lower end of which is pivoted upon a pin 149 carried by the bifurcated hanger 116.

The shaft 38 carries a cam disk 150 provided at one point in its periphery with a recess 151, and the cam disk co-acts with the roller 152 on the cam lever 148, the cam depression being so located that the parts will remain in clutched relationship only during the time that the roller 152 engages with the notch which coincides with the position occupied by the shaft while the pan is in its receiving position, which is the time during which the elevator must operate to deliver bundles into the pan.

The operation of these portions of the mechanism may be briefly outlined at this point as follows: As the ground wheel rotates freely upon the end 38 of the main shaft, the fingers 140 will be moved in an anti-clockwise direction as viewed in Fig. 16, and the fingers 134 will project through the ring track 135 and into the plane of movement of the rotating fingers.

As the upper left hand rotating finger 140 (Fig. 16) engages the left hand rocking finger 134, it will carry it down and thereby rock the shaft 133, the rotating finger riding upon the face of the cam track until the left hand depression 136 is reached at which point the rotating finger will escape from its engagement with the rocking finger. At this point, the right hand rocking finger will occupy a depressed position ready to be engaged by the lowermost finger 140 of the series of three. When this engagement occurs, the shaft 133 will be rocked in the opposite direction until a release is effected in the manner previously stated. Since three rotating fingers are provided in the embodiment shown, and since each of these three fingers during one revolution will engage each of the rocking fingers, it is evident that three complete oscillations will be afforded to the rock shaft 133, during each rotation of the ground wheel. These oscillations are imparted to the rock shaft 119 through the down pull of the spring relief connecting rod 132, but the return movements of the rock shaft 119 are effected through the pull of a coil spring 153 which connects an arm 154 on the shaft 119 with an upright 154ᵃ upstanding from the frame rail 28 of the elevator, as shown in Fig. 2. The rocking movements of the shaft 119 will cause an up and down oscillation of the elevator arms which will thus be moved from the receiving position, shown in Fig. 13, to the discharging position, shown in Fig. 14.

The means provided for rocking the tines 126 in order to clear the cradle on the down movement of the elevator will now be described, with especial reference to Figs. 13, 14 and 15. The rock shaft 127 upon which the tines are mounted, is provided with a rigidly connected ratchet segment 155 provided with a curvedly arranged series of laterally projecting pins 156, which pins are adapted to mesh with the teeth of a rack bar 157 which is guided through a stirrup 158 pivoted upon the shaft 127 (Fig. 14). The inner end of the rack bar 157 is connected with a pitman 159, the upper end of which is pivoted upon a pin 160 carried by a rider 161 slidably mounted upon a guide bar 162 which is fixedly secured to an adjacent portion of the elevator structure and oscillates therewith.

The rider has mounted thereon a roller 163 which in various positions co-acts successively with a swinging cam plate 164 and with a cam track bar 165. The cam plate 164 is fulcrumed upon a pin 166, carried by a bracket 167, mounted upon an arm 168, which latter assists in supporting the cam track bar 165, which is secured at its upper end to a standard 169 and at its lower end to a bar 170 projecting inwardly from the plate 145, the cam track being rigid with the machine frame, and the cam plate being adapted for limited oscillation to bring either of its ends into engagement with the cam track.

The standard 169 at its upper end 171 is outwardly bent and connects with a bracket 172 which arches over the upper end of the cam plate 164, so that as the roller 163, riding upon the convex edge of the cam plate approaches the upper end thereof, the roller will ride under the arched bracket 172 thereby forcing down the upper end of the pivoted cam plate against the tension of a spring 173 until the roller clears the end of the cam plate after which the upper end of the cam plate will spring back bringing the roller into engagement with the cam track bar 165 and behind the cam plate, as indicated in Fig. 14.

The convex edge of the cam plate is formed on a curvature substantially concentric with the shaft 119 which affords an axis of movement for the elevator, so that as the elevator is swinging upwardly, to carry a bundle to discharging position, there will be no operative co-action between the rack 157 and the segment 155, and during this period the tines 126 will maintain uniform space relationship with the fingers 125.

At the limit of the feeding stroke, however, the roller 163 will pass to the position shown in Fig. 14, so that on the return movement, the roller will ride behind the cam plate and along the track, and this will have the effect of drawing back the rack 157, as indicated in Fig. 15, which will swing the tines behind the cradle, so that on the return movement the tines will clear the cradle without interference. As soon as the roller has passed from under the lower edge of the rocking cam plate, the lower end of the latter will spring back against the track bar 165, so that on the up travel of the roller it will again ride along the concave edge of the plate, thereby holding the curved tines in extended position to engage and carry up the bundles and thrust them outwardly and downwardly into the pan.

*The butting board.*

At the forward end of the machine are located a pair of standards 174 (Figs. 1 and 3) the lower ends of which are secured to the front cross rail 23. The upper ends of the standards support a cross bar 175 provided at its ends with rearwardly turned slotted fingers 176 which support a cross rod 177 from which is hung a butting board 178 consisting of two sections 179 united at their ends by lower and upper straps 180 and 181, the latter of which has its ends turned forwardly and hinged to the cross rod 177. The butting board on its forward face, on each side, is provided with a lug 182 which receives the rear end of a thrust rod 183, the forward end of which is slidably entered through a lug 184 depending from the cross rail 23, and each rod is encircled by a spring 185 which normally acts to hold the rear or acting face of the butting board toward the forward end of the pan and in contact with the contents thereof, the pan being slightly curved to clear the face of the butting board.

Each section of the butting board is provided near its lower end on the inner or acting face with a narrow gate or flap 186, the upper edge of which is secured to a cross rod 187 pivoted to the outer face of the butting board section, and each rod at its outer end is turned to afford a crank section 188, each crank section having connected thereto a link 189 pivoted at its upper end to the frame structure. The arrangement is such that when the butting board is swung forwardly, as shown in dotted lines in Fig. 4, the flap sections will be thrown inwardly to partially obstruct the free sweep of the butt ends of the bundles as the shock is being up ended to assist in spreading the base of the shock as it is being grounded, which spreading operation is facilitated by the compression afforded against the head of the shock by the action of the compressors which terminate near the middle portion or waist of the shock.

*General statement concerning operation.*

In operation, the bundles will be delivered into the cradle from the harvester and in position to be elevated by the extended tines and deposited butt end foremost within the pan. After a sufficient number of bundles have been thus deposited, the operator will rock the shaft 102 which has the effect of releasing the latches which support the front end of the pan and simultaneously the pan shaft will be thrown into clutched relation with the constantly rotating ground wheels. The pan will thus begin to rotate and at the same time the compressor wings will begin to close in on the bundles contained within the pan.

When the pan has reached the vertical position, and the shock is butted upon the ground, the pan will be afforded a limited rearward travel with respect to the machine frame, which not only momentarily releases the shock from any thrust from the rear due to the moving forward of the pan, but also adjusts the pan in preparation for its vaulting movement over the top of the deposited shock.

Although the invention has been described with particularity, it is not the intention to limit the invention to the specific mechanism herein shown, since the same might be modified in various particulars without departing from the spirit of the invention.

We claim:

1. In a shocker, the combination of a frame, a ground wheel for supporting the frame, a shock container, and means actuated by the ground wheel for rotating the container and simultaneously moving the same bodily backward with respect to the frame and upward to clear the deposited shock, substantially as described.

2. In a shocker, the combination of a frame, a ground wheel for supporting the frame, a shock container, and means actuated by the ground wheel for rotating the container and simultaneously moving the same backward and upward to clear the deposited shock, said means including a cam track, and means actuated thereby, substantially as described.

3. In a shocker, the combination of a frame, a ground wheel for supporting the frame, a shock container, means actuated by the ground wheel for rotating the container and simultaneously moving the same backward and upward to clear the deposited shock, said means including a shaft rotatable around a fixed axis, means for clutching the shaft with the ground wheel and means for varying the position of the container with respect to the shaft, substantially as described.

4. In a shocker, the combination of a frame, a ground wheel for supporting the frame, a shock container, means actuated by the ground wheel for rotating the container and simultaneously moving the same backward and upward to clear the deposited shock, said means including a shaft rotatable around a fixed axis, means for clutching the shaft with the ground wheel and cam actuated means for varying the position of the container with respect to the shaft during the period of rotation, substantially as described.

5. In a shocker, the combination of a frame, a shaft journalled on a fixed axis within the frame, ground wheels and means for engaging the same with the shaft, a container adjustably connected with said shaft and held in position to be rotated therewith, and connections between the container and the frame adapted to coact to move the container rearwardly of its normal position with respect to the shaft during the rotation of the shaft and container, substantially as described.

6. In a shocker, the combination of a frame, a shaft journalled on a fixed axis within the frame, a container adjustably connected with said shaft in a manner to rotate therewith, means acting to adjust the relation of the container to the shaft during the rotation of the container, and ground engaging means adapted to impart rotation to the shaft, substantially as described.

7. In a shocker, the combination of a frame, a shaft journalled on a fixed axis within the frame, a container adjustably connected with said shaft in a manner to rotate therewith, means acting to adjust the relation of the container to the shaft during the rotation of the container, a ground wheel, and means for engaging the ground wheel with the shaft for imparting rotation thereto, substantially as described.

8. In a shocker, the combination of a frame, an arched axle journalled within the frame, means for rotating the axle, a container cradled within the arched axle and held thereby in position to rotate therewith, and means acting to adjust the relation between the container and the axle during the period of rotation, substantially as described.

9. In a shocker, the combination of a frame, an arched axle journalled within the frame, means for rotating the axle, a container cradled within the arched axle and held thereby in position to rotate therewith, and cam actuated elements carried in part by the container and in part by the frame, for adjusting the relation between the container and the axle during the period of rotation, substantially as described.

10. In a shocker, the combination of a frame, an arched axle journalled within the frame, means for rotating the axle, a container cradled within the arched axle and held thereby in position to rotate therewith, means for adjusting the relation between the container and the axle during the period of rotation, and ground engaging means for imparting rotation to the axle, substantially as described.

11. In a shocker, the combination of a frame, an arched axle journalled within the frame, a container cradled within the arched axle and held in position to rotate therewith, cam actuated elements in part on the cradle and in part on the frame, for adjusting the relation between the container and the axle during the period of rotation, and ground engaging means adapted to impart rotation to the axle, substantially as described.

12. In a shocker, the combination of a frame, an arched axle journalled within the frame, means for rotating the axle, an open sided pan cradled within the arched axle, with its open side normally presented upwardly and held by the axle in position to rotate therewith, and means adapted to adjust the relation between the pan and the axle during the period of rotation, substantially as described.

13. In a shocker, the combination of a frame, an arched axle journalled within the frame, means for rotating the axle, an open sided pan cradled within the arched axle, with its open side normally presented upwardly and held by the axle in position to rotate therewith, and cam actuated elements adapted to adjust the relation between the pan and the axle during the period of rotation, substantially as described.

14. In a shocker, the combination of a frame, an arched axle journalled within the frame, an open sided pan cradled within the arched axle and held in position to be rotated therewith, means for adjusting the relation between the pan and the axle during the period of rotation, and ground engaging means for imparting rotation to the axle, substantially as described.

15. In a shocker, the combination of a frame, an arched axle journalled within the frame, an open sided pan cradled within the arched axle and held in position to rotate therewith, cam actuated elements for adjusting the relation between the pan and the axle during the period of rotation, and ground engaging means for imparting rotation to the axle, substantially as described.

16. In a shocker, the combination of a frame, an arched axle journalled within the frame, a ground wheel, and clutch mechanism for clutching the ground wheel to the axle, an open sided pan cradled within the arched axle and normally presenting its open side upwardly, a bracket on each side of the pan, rigidly secured thereto and held in adjustable relation with respect to the proximate ends of the axle, and means for varying the relation of said brackets to the ends of the axle during the period of rotation of the pan and axle, substantially as described.

17. In a shocker, the combination of a frame, an arched axle journaled within the frame, a ground wheel and clutch mechanism for clutching the ground wheel to the axle, an open sided pan cradled within the arched axle, a bracket on each side of the pan rigidly secured thereto, and held in adjustable relation with respect to the proximate ends of the shaft, means for varying the relation of said brackets to the shaft during the rotation of the pan, said means including a cam track for each bracket, and a contacting member carried by the latter and adapted to ride upon the associated cam track, substantially as described.

18. In a shocker, the combination of a frame, an arched axle journaled within the frame, a ground wheel and clutch mechanism for clutching the ground wheel to the axle, an open sided pan cradled within the arched axle, a slotted bracket on each side secured to the normally upper portion of the pan and embracing a proximate portion of the shaft and slidable thereon, and means for varying the position of the brackets with respect to the shaft during the rotation of the pan, substantially as described.

19. In a shocker, the combination of a frame, an arched axle journaled within the frame, a ground wheel and clutch mechanism for clutching the ground wheel to the axle, an open sided pan cradled within the arched axle, a slotted bracket on each side secured to the normally upper portion of the pan and embracing a proximate portion of the shaft and slidable thereon, means for varying the position of the brackets with respect to the shaft during the rotation of the pan, said means including a fixed cam track for each bracket, and a roller journaled to the bracket and adapted to contact with the associated cam track, substantially as described.

20. In a shocker, the combination of a frame, an arched axle journaled within the frame, a ground wheel and clutch mechanism for clutching the ground wheel to the axle, an open sided pan cradled within the arched axle, a slotted bracket on each side secured to the normally upper portion of the pan and embracing a proximate portion of the shaft and slidable thereon, means for varying the position of the brackets with respect to the shaft during the rotation of the pan, said means including a fixed cam track for each bracket, and a roller at each end of each bracket, said rollers adapted in turn to make contact with the associated cam track during the rotation of the pan, substantially as described.

21. In a shocker, the combination of a frame, a shaft journaled within the frame, ground engaging means for rotating the shaft, a pan adjustably mounted with respect to the shaft and adapted to be rotated thereby, a bracket on each side of the pan and in slidable relation to the proximate portion of the shaft, means acting upon each bracket for adjusting the relation of the pan to the shaft during rotation, a compressor member on each side of the pan adapted to be folded down to compressing position, and lever mechanisms associated with each bracket and adapted to be actuated during the rotation of the pan to fold down the compressor members into compressing position, substantially as described.

22. In a shocker, the combination of a frame, a shaft journaled within the frame, ground engaging means for rotating the shaft, a pan adjustably mounted with respect to the shaft and adapted to be rotated thereby, a bracket on each side of the pan and in slidable relation to the proximate portion of the shaft, means acting upon each bracket for adjusting the relation of the pan to the shaft during rotation, a compressor member on each side of the pan adapted to be folded down to compressing position, and lever mechanisms associated with each bracket and adapted to be actuated during the rotation of the pan to fold down the compressor members into compressing position, said lever mechanisms including a member transversely and slidably mounted with respect to the associated bracket, substantially as described.

23. In a shocker, the combination of a frame, a shaft journaled within the frame, ground engaging means for rotating the shaft, a pan adjustably mounted with respect to the shaft and adapted to be rotated thereby, a bracket on each side of the pan and in slidable relation to the proximate portion of the shaft, means acting upon each bracket for adjusting the relation of the pan to the shaft during rotation, a compressor member on each side of the pan adapted to be folded down to compressing position, and lever mechanisms associated with each bracket and adapted to be actuated during the rotation of the pan to fold down the compressor members into compressing position, said lever mechanisms including a member transversely and slidably mounted with respect to the associated bracket, said slidable member being acted upon by the same mechanisms which effect adjustment of the associated bracket, substantially as described.

24. In a shocker, the combination of a frame, a shaft journaled within the frame, ground engaging means for rotating the shaft, a pan adjustably mounted with respect to the shaft and adapted to be rotated thereby, a bracket on each side of the pan and in slidable relation to the proximate portion of the shaft, a fixedly positioned cam track for each bracket adapted to be engaged by the bracket during rotation, a compressor member journaled on each side of the pan and adapted to be folded inwardly to compress the contents of the pan, means associated with each bracket and adapted to engage the cam track during rotation, and connections between said means and the proximate compressor for folding the latter inwardly during the rotation of the pan, substantially as described.

25. In a shocker, the combination of a frame, a shaft journaled within the frame, ground engaging means for rotating the shaft, a pan adjustably mounted with respect to the shaft and adapted to be rotated thereby, a bracket on each side of the pan and in slidable relation to the proximate portion of the shaft, a fixedly positioned cam track for each bracket adapted to be engaged by the bracket during rotation, a compressor member journaled on each side of the pan and adapted to be folded inwardly to compress the contents of the pan, a slidable plate associated with each bracket and extending transversely thereof and adapted to engage with the same means which actuate the bracket, and connections between each slide plate and the associated compressor for actuating the latter during the rotation of the pan, substantially as described.

26. In a shocker, the combination of a frame, an arched axle journaled within the frame, a ground wheel mounted upon one end of the arched axle and adapted to rotate the same, a pan cradled within the arched axle and mounted for movement transversely of the axis of said axle, a cam track, and means in contact therewith for imparting such transverse movements to the pan during its rotation, a compressor on each side of the pan, a shaft for each compressor normally extending in substantially parallel relation to the proximate edge of the pan, a mounting for each shaft for permitting oscillation of the normally rearward end of said shaft toward the base of the pan, and connections for each compressor adapted to engage with the proximate cam track and adapted first to impart a movement of rotation to each compressor shaft and thereafter to impart a movement of oscillation to said shaft during the rotation of the pan, substantially as described.

27. In a shocker, the combination of a frame, an open sided pan carried by the frame, an elevator arm provided with projecting tines adapted to engage a bundle of grain, a rock shaft upon which said tines are mounted, a cradle positioned to permit the tines to sweep therethrough when in projecting position to carry up bundles deposited in the cradle, and means adapted upon the return movement of the elevator arm to retract the tines to clear the cradle, substantially as described.

28. In a shocker, the combination of a frame, an open sided pan carried by the frame, an elevator arm provided with projecting tines adapted to engage a bundle of grain, a rock shaft upon which said tines are mounted, a cradle positioned to permit the tines to sweep therethrough when in projecting position to carry up bundles deposited in the cradle, and means adapted upon the return movement of the elevator arm to retract the tines to clear the cradle, said means including a pinion on the tine shaft, a rack in mesh with said pinion, and cam mechanism for operating said rack, substantially as described.

29. In a shocker, the combination of a frame, an open sided pan carried by the frame and normally presenting its open side upwards, an oscillating elevator, a rock shaft for journaling the elevator in position to permit the acting end of the elevator to swing upwardly to discharging position above the pan, means for rocking said shaft, a fixed cradle located near the outer end of said oscillating elevator, tines carried by the elevator and adapted when projecting to sweep through said cradle to engage bundles deposited therein, and means for retracting said tines on the return movement of the elevator to clear the cradle, substantially as described.

30. In a shocker, the combination of a frame, an open sided pan carried by the frame and normally presenting its open side upwards, an oscillating elevator, a rock shaft for journaling the elevator in position to permit the acting end of the elevator to swing upwardly to discharging position above the pan, means for rocking said shaft, a fixed cradle located near the outer end of said oscillating elevator, tines carried by the elevator and adapted when projecting to sweep through said cradle to engage bundles deposited therein, and means for retracting said tines on the return movement of the elevator to clear the cradle, said means including cam actuated rack and pinion devices, substantially as described.

31. In a shocker, the combination of a frame, an open sided pan carried by the frame and normally presenting its open side upwards, an oscillating elevator, a rock shaft for journaling the elevator in position to permit the acting end of the elevator to swing upwardly to discharging position above the pan, means for rocking said shaft, a fixed cradle located near the outer end of said oscillating elevator, tines carried by the elevator and adapted when projecting to sweep through said cradle to engage bundles deposited therein, and means for retracting said tines on the return movement of the elevator to clear the cradle, said means including a rock shaft upon which all of the tines are fixedly mounted, a pinion carried by said rock shaft, a rack in engagement with said pinion, an oscillating cam and associated track, and means for engaging in turn first with one edge of the oscillating cam and afterwards with the other edge thereof and with the track, substantially as described.

32. In a shocker, the combination of a frame, a ground wheel rotatably mounted on the frame, a pan carried by the frame, an oscillating elevator, a plurality of yielding fingers carried by the ground wheel, a fixed circular track upon which said fingers ride, said track being provided with depressions, a rock shaft in proximity to said track and provided with a plurality of fingers adapted to be engaged by the first mentioned fingers when the latter are riding upon the normal surface of the track and adapted to be released when said fingers arrive at a depression in the track for rocking the shaft, and connections between said rock shaft and said elevator for oscillating the latter, substantially as described.

33. In a shocker, the combination of a frame, a ground wheel rotatably mounted on the frame, a pan carried by the frame, an oscillating elevator, a plurality of yielding fingers carried by the ground wheel, a fixed circular track upon which said fingers ride, said track being provided with depressions, a rock shaft in proximity to said track and provided with a plurality of fingers adapted to be engaged by the first mentioned fingers when the latter are riding upon the normal surface of the track and adapted to be released when the fingers arrive at a depression in the track for rocking the shaft, and connections between said rock shaft and said elevator for oscillating the latter, the said connections including clutch mechanism adapted to be disengaged when the pan moves away from receiving position, substantially as described.

34. In a shocker, the combination of a frame, an open sided pan carried by the frame, a ground wheel journaled in the frame and adapted to be connected with the pan for rotating the same, an elevator rock shaft extending longitudinally of the frame, an oscillating elevator mounted upon and actuated by said rock shaft, a plurality of yieldable fingers carried by the ground wheel, a track upon which said fingers ride, said track being provided with spaced depressions, a second rock shaft journaled in proximity to said fingers and itself provided with co-acting fingers adapted to be engaged by the first mentioned fingers when riding upon the normal surface of the track, the engaged fingers being released by the recession of the rotating fingers when arriving at a depression in the track, a crank on each of the rock shafts, and a connection between the two cranks for transmitting rocking movements from one to the other, substantially as described.

35. In a shocker, the combination of a frame, an open sided pan carried by the frame, a ground wheel journaled in the frame and adapted to be connected with the pan for rotating the same, an elevator rock shaft extending longitudinally of the frame, an oscillating elevator mounted upon and actuated by said rock shaft, a plurality of yieldable fingers carried by the ground wheel, a track upon which said fingers ride, said track being provided with spaced depressions, a second rock shaft journaled in proximity to said fingers and itself provided with co-acting fingers adapted to be engaged by the first mentioned fingers when riding upon the normal surface of the track, the engaged fingers being released by the recession of the rotating fingers when arriving at a depression in the track, a crank on each of the rock shafts, a connection between the two cranks for transmitting rocking movements from one to the other, and clutch mechanism actuated by the rotation of the pan for interrupting the transmission of power to the elevator shaft when the pan moves away from receiving position, substantially as described.

36. In a shocker, the combination of a frame, an open sided pan tiltably mounted within the frame, a butting board in proximate relation to the discharging end of the pan, a flap near the lower end of the butting board, and connections adapted to project said flap toward the pan during the tilting of the contents thereof, substantially as described.

37. In a shocker, the combination of a frame, an open sided pan tiltably mounted within the frame, a butting board in proximate relation to the discharging end of the pan, a flap near the lower end of the butting board, and connections adapted to project said flap toward the pan during the tilting thereof, said butting board being contracted and oscillated forwardly by contact with the contents of the pan during the tilting movement, substantially as described, 38. In a shocker, the combination of a frame, an open sided pan carried by the frame, a butting board located adjacent to the forward or discharging end of the pan, a support for pivotally suspending the butting board from its upper portion, the contents of the pan and butting board being in contact to effect a forward swing of the butting board during the tilting of the pan, a flap pivoted near the lower end of the pan and adapted when lifted to project rearwardly toward the pan, a linkage connected with said flap and adapted when the butting board is swung forwardly to lift the flap into position to engage the contents of the pan during the discharge thereof, substantially as described.

39. In a shocker, the combination of a frame, a rotatably mounted axle journaled within the frame, a pan carried by the axle and rotatable therewith, ground wheels loosely mounted upon the ends of the axle, clutches for clutching the respective ground wheels to the ends of the axle, latch supports for the forward ends of the pan, and connections between the clutches and latches for simultaneously unlatching the pan and clutching the axle to the ground wheels, substantially as described.

40. In a shocker, the combination of a frame, an arched axle journaled to the frame, a pan cradled within the arch in the axle, ground wheels loosely mounted on the ends of the axle, dog and ratchet mechanism for each of the ground wheels for clutching the ground wheels to the axle, latches normally engaging the forward end of the pan on opposite sides thereof, and connections between said latches and said ratchet members for operating the same to simultaneously unlatch the forward end of the pan and engage the pan axle with the rotating ground wheels, substantially as described.

CONRAD ESPING.
ROBERT ESPING.